(12) United States Patent
Hayashiguchi et al.

(10) Patent No.: US 12,049,940 B2
(45) Date of Patent: Jul. 30, 2024

(54) SHOCK ABSORBER

(71) Applicant: KYB CORPORATION, Tokyo (JP)

(72) Inventors: Takumi Hayashiguchi, Tokyo (JP); Koichiro Awano, Tokyo (JP); Takahisa Mochizuki, Tokyo (JP); Sodai Shimauchi, Gifu (JP)

(73) Assignee: KYB Corporation, Tokyo (JP)

( * ) Notice: Subject to any disclaimer, the term of this patent is extended or adjusted under 35 U.S.C. 154(b) by 535 days.

(21) Appl. No.: 17/434,674

(22) PCT Filed: Feb. 28, 2020

(86) PCT No.: PCT/JP2020/008374
§ 371 (c)(1),
(2) Date: Mar. 10, 2022

(87) PCT Pub. No.: WO2020/179678
PCT Pub. Date: Sep. 10, 2020

(65) Prior Publication Data
US 2023/0108079 A1    Apr. 6, 2023

(30) Foreign Application Priority Data

Mar. 4, 2019   (JP) ................................ 2019-038124

(51) Int. Cl.
*F16F 9/34* (2006.01)
*F16F 9/18* (2006.01)
(Continued)

(52) U.S. Cl.
CPC ............ *F16F 9/182* (2013.01); *F16F 9/3221* (2013.01); *F16F 9/516* (2013.01); *B62K 25/08* (2013.01);
(Continued)

(58) Field of Classification Search
CPC .. F16F 9/462; F16F 9/468; F16F 9/467; F16F 9/182; F16F 9/516; F16F 9/065; F16F 9/3221
See application file for complete search history.

(56) References Cited

U.S. PATENT DOCUMENTS 4,681,143 A * 7/1987 Sato ....................... B60G 17/08
                                                 137/625.37
4,696,489 A * 9/1987 Fujishiro .............. B60G 17/018
                                                  280/5.515
(Continued)

FOREIGN PATENT DOCUMENTS

| CN | 206368936 U | 8/2017 |
| JP | 2005-351419 A | 12/2005 |

(Continued)

OTHER PUBLICATIONS

Mar. 1, 2023, Chinese Office Action issued for related CN Application No. 202080009980.5.

(Continued)

*Primary Examiner* — Bradley T King
(74) *Attorney, Agent, or Firm* — Paratus Law Group, PLLC

(57) ABSTRACT

A shock absorber is provided with a cylinder, a piston inserted into the cylinder and demarcating an interior of the cylinder into an extension side chamber and a compression side chamber, a piston rod joined to the piston, a damping passage, provided in the piston rod, that communicates with the extension side chamber and the compression side chamber, and a damping force adjustment valve provided in the damping passage. The damping force adjustment valve includes a damping force adjustment unit and a solenoid that drives the damping force adjustment unit to adjust a flow channel resistance. The piston rod includes a yoke into which the damping force adjustment valve is inserted, and a (Continued)

piston holding member mounted on the yoke. The yoke includes a through-hole opening from a side of the yoke and leading to the interior, and a groove provided on a perimeter of the yoke, extending from an anti-piston end, and leading to the through-hole.

2 Claims, 4 Drawing Sheets

(51) Int. Cl.
*F16F 9/32* (2006.01)
*F16F 9/516* (2006.01)
*B62K 25/08* (2006.01)
*F16F 9/06* (2006.01)

(52) U.S. Cl.
CPC ........... *F16F 9/065* (2013.01); *F16F 2222/12* (2013.01); *F16F 2228/066* (2013.01); *F16F 2232/08* (2013.01); *F16F 2234/02* (2013.01)

(56) References Cited

U.S. PATENT DOCUMENTS

| | | | | | |
|---|---|---|---|---|---|
| 6,170,809 | B1* | 1/2001 | Cotter | ................... | F16F 9/516 267/130 |
| 2004/0094376 | A1* | 5/2004 | van Wonderen | ........ | F16F 9/467 188/287 |
| 2012/0175830 | A1* | 7/2012 | Yang | ..................... | F16F 9/0218 267/140.13 |
| 2012/0187651 | A1* | 7/2012 | Wimmer | ................ | B62K 25/08 280/276 |
| 2013/0206521 | A1 | 8/2013 | Nakajima | | |
| 2017/0268595 | A1* | 9/2017 | Inagaki | ..................... | F16F 9/34 |
| 2018/0156298 | A1 | 6/2018 | Schmitt et al. | | |
| 2020/0166097 | A1* | 5/2020 | Kadokura | ............... | F16F 9/465 |
| 2020/0340546 | A1* | 10/2020 | Mizuno | .................. | B60G 17/08 |
| 2021/0062564 | A1* | 3/2021 | Kato | ....................... | F16F 9/516 |
| 2022/0364626 | A1* | 11/2022 | Leclercq | ............... | F16F 9/3207 |
| 2023/0109503 | A1* | 4/2023 | Awano | .................... | F16F 9/516 188/282.1 |

FOREIGN PATENT DOCUMENTS

| | | |
|---|---|---|
| JP | 2013-139865 A | 7/2013 |
| JP | 2013-167304 A | 8/2013 |
| JP | 2018-004026 A | 1/2018 |
| JP | 2018-514717 A | 6/2018 |

OTHER PUBLICATIONS

Aug. 29, 2023, Chinese Office Action issued for related CN Application No. 202080009980.5.

May 26, 2023, German Office Action issued for related DE Application No. 112020001054.6.

* cited by examiner

SHOCK ABSORBER

CROSS REFERENCE TO PRIOR APPLICATION

This application is a National Stage Patent Application of PCT International Patent Application No. PCT/JP2020/008374 (filed on Feb. 28, 2020) under 35 U.S.C. § 371, which claims priority to Japanese Patent Application No. 2019-038124 (filed on Mar. 4, 2019), which are all hereby incorporated by reference in their entirety.

TECHNICAL FIELD

The present invention relates to an improvement of a shock absorber.

BACKGROUND ART

Some shock absorbers for vehicles have an adjustable damping force to effectively moderate vehicle body vibrations. A damping force adjustment valve is used to adjust the damping force of the shock absorber. A known damping force adjustment valve is provided with a cylindrical housing including a port that communicates with the interior and exterior of the housing, a cylindrical spool slidably inserted into the housing, a spool spring that biases the spool, and a solenoid that drives the spool in opposition to the biasing force of the spool spring (for example, see Patent Literature 1).

In such a damping force adjustment valve, the spool is driven with respect to the housing by the solenoid to cause the perimeter of the spool to face the port and thereby open and close the port, adjust the opening degree of the port, and vary the flow channel area. If the damping force adjustment valve configured in this way is provided partway in a passage through which hydraulic oil passes when the shock absorber extends, the flow channel resistance imparted to the flow of the hydraulic oil passing through the passage can be varied, and the damping force of the shock absorber can be adjusted.

CITATION LIST

Patent Literature

Patent Literature 1: JP 2013-139865 A

SUMMARY OF INVENTION

Technical Problem

When using such a damping force adjustment valve in a shock absorber, in some cases the damping force adjustment valve may be installed partway in a passage that communicates with an extension side chamber and a compression side chamber divided by a piston inside a cylinder of the shock absorber, as disclosed in JP 2005-351419A, for example.

In such cases, it is sufficient for the damping force adjustment valve to be housed inside the piston rod, such that a resistance is imparted by the damping force adjustment valve to the hydraulic oil passing through the passage. Specifically, the compression side chamber communicates with the interior of a housing part through a longitudinal hole provided in a piston mounting shaft that holds the piston of the piston rod, the extension side chamber communicates with the interior of the housing part through a through-hole that opens from the side of the housing part, such that a passage is formed by the longitudinal hole, the through-hole, and the housing part, and the damping force adjustment valve is installed inside the housing part. With such a configuration, the damping force adjustment valve is provided in a passage that communicates with the extension side chamber and the compression side chamber, and the damping force of the shock absorber can be adjusted.

However, based on the relationship of how the damping force adjustment valve is housed inside the piston rod, the outer dimensions of the housing part that houses the damping force adjustment valve of the piston rod increase, and the annular gap between the housing part and the cylinder becomes extremely narrow.

If the annular gap between the housing part and the cylinder is narrowed, the flow channel area of the annular gap becomes narrower than the flow channel area of the damping force adjustment valve when the valve is fully open, and the pressure loss in the annular gap may be greater than the pressure loss in the damping force adjustment valve.

Furthermore, the minimum damping force of the shock absorber is determined by the resistance in the annular gap and can no longer be adjusted by the damping force adjustment valve, the damping force adjustment range of the shock absorber is narrowed, and the damping force rises in the full soft mode.

Accordingly, an objective of the present invention is to provide a shock absorber capable of widening the damping force adjustment range and also lowering the damping force in the full soft mode, even if a damping force adjustment valve using a solenoid is provided.

Solution to Problem

A shock absorber that addresses the above problem includes a cylinder, a piston inserted into the cylinder in a state allowing movement in an axial direction and demarcating an interior of the cylinder into an extension side chamber and a compression side chamber, a piston rod joined to the piston and having an end that projects out from the cylinder, a damping passage, provided in the piston rod, that communicates with the extension side chamber and the compression side chamber, and a damping force adjustment valve provided in the damping passage, in which the damping force adjustment valve includes a damping force adjustment unit provided in the damping passage and a solenoid that drives the damping force adjustment unit to adjust a flow channel resistance, the piston rod includes a tubular yoke into which the damping force adjustment valve is inserted, and a piston holding member mounted on an inner perimeter of the yoke and configured to hold the piston, and the yoke includes a plurality of through-holes opening from a side of the yoke and leading to an interior of the yoke to form a portion of the damping passage, and a groove provided on a perimeter of the yoke, extending from an anti-piston end, and leading to the through-hole.

In a shock absorber configured in this way, the through-hole and the groove are formed on the perimeter of the yoke where the annular gap with respect to the cylinder in which the damping force adjustment valve is inserted is narrowest, and the flow channel area in the annular gap between the cylinder and the yoke is enlarged.

Also, the groove in the shock absorber may be provided on the perimeter of the yoke along the axial direction. According to a shock absorber configured in this way, the length of the groove is shortest on the line connecting the end of the anti-piston side of the yoke to the through-hole, and the resistance when liquid passes through the groove is minimized, thereby reducing the damping force further in the full soft mode and improving the ride quality of the vehicle.

Advantageous Effects of Invention

The shock absorber according to the present invention is capable of widening the damping force adjustment range and also lowering the damping force in the full soft mode, even if a damping force adjustment valve using a solenoid is provided.

DESCRIPTION OF EMBODIMENTS

Figure 1:
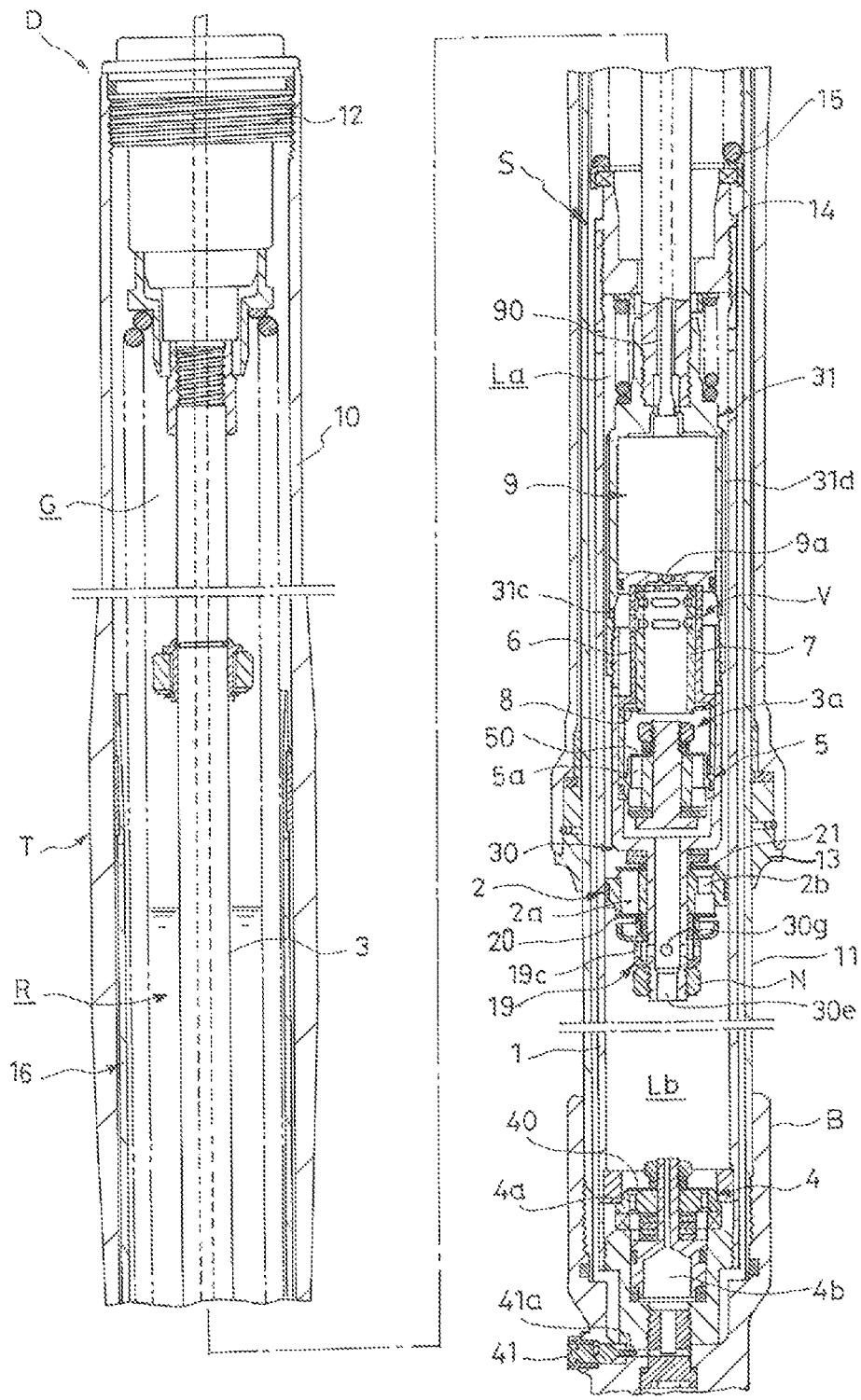
FIG. 1 is a longitudinal section of a shock absorber according to an embodiment of the present invention.

Hereinafter, a shock absorber D according to an embodiment of the invention will be described with reference to the drawings. The same reference numerals denoted throughout several drawings refer to the same components or corresponding components. Further, a shock absorber D according to an embodiment of the present invention is used for a front fork suspending front wheels of a saddle-riding type vehicle. In the following description, upper and lower directions in a state where the front fork including the shock absorber D is installed in a vehicle are simply referred to as "upper" or "up" and "lower" or "down", respectively, or referred to as "vertically", unless otherwise specified. Note that the shock absorber D may also be used in a vehicle other than a saddle-riding type vehicle.

The shock absorber D is provided with a cylinder 1, a piston 2 inserted into the cylinder 1 to allow movement in the axial direction and dividing the interior of the cylinder 1 into an extension side chamber La and a compression side chamber Lb, a piston rod 3 joined to the piston 2 and having one end projecting out from the cylinder 1, a bypass passage 3a provided in the piston rode 3 and acting as a damping passage that communicates with the extension side chamber La and the compression side chamber Lb, and a damping force adjustment valve V provided in the bypass passage 3a.

Note that in the present embodiment, the shock absorber D is configured as a one-sided shock absorber that exhibits damping force only during contraction, and the damping force adjustment valve V is used to adjust the compression side damping force of the shock absorber D. Note that although not illustrated in the drawings, the shock absorber D is joined to a one-sided shock absorber that exhibits a damping force only during extension by a bracket joined to a steering shaft of the saddle-riding type vehicle. Consequently, the shock absorber D and the shock absorber that exhibits a damping force only during extension are paired to form a front fork that supports the front wheel of the saddle-riding type vehicle, and cooperate to moderate vibrations in the body of the saddle-riding type vehicle. Note that the shock absorber D may exhibit damping force only during extension or exhibit damping force during both extension and contraction, and the damping force adjustment valve V may be used to adjust the damping force.

Figure 2:
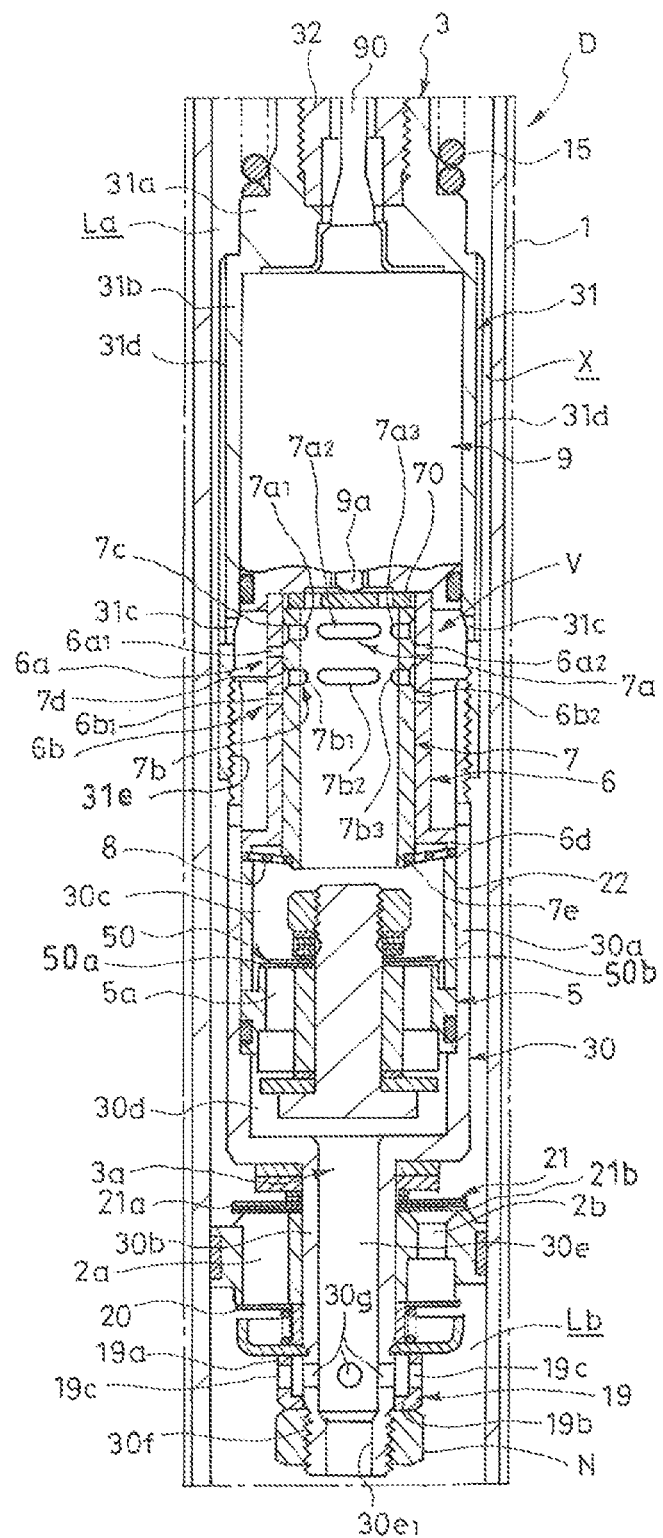
FIG. 2 is a vertical sectional view illustrating a part of FIG. 1 in an enlarged manner.

Hereinafter, the shock absorber D according to one embodiment of the present invention will be described specifically. As illustrated in FIG. 2, the shock absorber D is provided with a telescopic tube member T including an outer tube 10 and an inner tube 11 slidably inserted into the outer tube 10.

Additionally, if the saddle-riding type vehicle runs on an uneven road surface or the like and the front wheel shakes vertically, the inner tube 11 enters and exits the outer tube 10, and the tube member T extends and contracts. In this way, the extension and contraction of the tube member T are also referred to as the extension and contraction of the shock absorber D. Note that the tube member T may be of the upright type, such that the outer tube 10 is the axle side tube and the inner tube 11 is the vehicle body side tube.

Next, the upper end of the outer tube 10 that acts as the upper end of the tube member T is closed by a cap 12. On the other hand, the lower end of the inner tube 11 that acts as the lower end of the tube member T is closed by an axle side bracket B. Furthermore, a tubular gap formed in the part where the outer tube 10 and the inner tube 11 overlap is closed by an annular sealing member 13 mounted on the lower end of the outer tube 10 and in sliding contact with the perimeter of the inner tube 11.

With this arrangement, the interior of the tube member T is a closed space, and a shock absorber main body S is contained inside the tube member T. The shock absorber main body S includes the cylinder 1 provided inside the inner tube 11, the piston 2 slidably inserted into the cylinder 1, and the piston rod 3 having a lower end joined to the piston 2 and an upper end projecting out from the cylinder 1 and joined to the cap 12.

The cap 12 is joined to the outer tube 10, and therefore the piston rod 3 may be considered to be joined to the outer tube 10. Furthermore, the cylinder 1 is joined to the inner tube 11. In this way, the shock absorber main body S is interposed between the outer tube 10 and the inner tube 11.

Also, an annular head member 14 is mounted on the upper end of the cylinder 1, and the piston rod 3 movably penetrates the inner side of the head member 14 in the axial direction. The head member 14 slidably supports the piston rod 3, and a suspension spring 15 containing a coil spring is interposed between the head member 14 and the cap 12.

Additionally, when the shock absorber D extends and contracts and the inner tube 11 enters and exits the outer tube 10, the piston rod 3 enters and exists the cylinder 1, and the piston 2 moves up and down (in the axial direction) inside the cylinder 1.

Additionally, when the shock absorber D contracts and the piston rod 3 enters the cylinder 1, the suspension spring 15 is compressed and exhibits an elastic force that biases the shock absorber D in the extension direction. In this way, the suspension spring 15 exhibits an elastic force according to the compression amount, and elastically supports the vehicle body.

Note that the shock absorber D according to the present embodiment is of the single rod type, and the piston rod 3 extends out of the cylinder 1 from one side of the piston 2. However, the shock absorber D may also be of the dual rod type, and piston rods may extend out of the cylinder from both sides of the piston. Furthermore, the piston rod 3 may project downward from the cylinder 1 and be joined to the axle side, and the cylinder 1 may be joined to the vehicle body side. In addition, the suspension spring 15 may also be a spring other than a coil spring, such as an air spring.

Next, a liquid chamber filled with a liquid such as hydraulic oil is formed inside the cylinder 1, and the liquid chamber is divided into the extension side chamber La and the compression side chamber Lb by the piston 2. The extension side chamber referred to herein is the chamber of the two chambers divided by the piston that is compressed by the piston when the shock absorber extends. On the other hand, the compression side chamber is the chamber of the two chambers divided by the piston that is compressed by the piston when the shock absorber contracts.

Also, the outside of the cylinder 1, or more specifically, the space between the shock absorber main body S and the tube member T, acts as a liquid storage chamber R. In the liquid storage chamber R, the same liquid as the liquid inside the cylinder 1 is stored, and in addition, a gas chamber G filled with a gas such as air is formed above the liquid level. In this way, the tube member T functions as the outer shell of a tank 16 that stores liquid separately from the liquid inside the cylinder 1.

The liquid storage chamber R acting as the interior of the tank 16 communicates with the extension side chamber La, and the pressure of the extension side chamber La is continuously and substantially equal to the pressure (tank pressure) inside the tank 16 (liquid storage chamber R). Furthermore, the liquid storage chamber R is partitioned from the compression side chamber Lb by a valve case 4 secured on the lower end of the cylinder 1. In the valve case 4, a suction passage 4a that communicates with the compression side chamber Lb and the liquid storage chamber R is formed, and in addition, a suction valve 40 that opens and closes the suction passage 4a is installed.

The suction valve 40 is an extension side check valve that opens the suction passage 4a when the shock absorber D extends and allows a flow of liquid proceeding through the suction passage 4a from the liquid storage chamber R to the compression side chamber Lb, but keeps the suction passage 4a closed when the shock absorber D contracts. Note that the suction valve 40 according to the present embodiment is a leaf valve, but may also be a poppet valve or the like.

Also, an extension side passage 2a and a compression side passage 2b that communicate with the extension side chamber La and the compression side chamber Lb are formed in the piston 2, while in addition, an extension side check valve 20 that opens and closes the extension side passage 2a and a hard side damping element 21 that imparts a resistance to the flow of liquid that proceeds from the compression side chamber Lb to the extension side chamber La through the compression side passage 2b are attached to the piston 2.

The hard side damping element 21 is configured to include a leaf valve 21a stacked on the upper side of the piston 2 and an orifice 21b provided in parallel with the leaf valve 21a.

The leaf valve 21a is a thin annular plate formed using a metal or the like, or a laminated body formed by stacking such annular plates, is elastic, and is mounted on the piston 2R in a state allowing outward circumferential flexion. Furthermore, the pressure of the compression side chamber Lb acts on the leaf valve 21a in a direction causing the peripheral part to flex upward. Also, the orifice 21b is formed by a notch provided in the peripheral part of the leaf valve 21a that leaves and lands on a valve seat (not illustrated) of the piston 2R, but may also be formed by a stamp or the like provided in the seat.

When the shock absorber D contracts, the piston 2 is compressed and the internal pressure inside the compression side chamber Lb rises higher than the pressure in the extension side chamber La. In the case where the piston speed is in a low-speed range during such contraction of the shock absorber D, and the differential pressure between the compression side chamber Lb and the extension side chamber La does not satisfy the valve-opening pressure of the leaf valve 21a, liquid passes through the orifice 21b and proceeds from the compression side chamber Lb to the extension side chamber La, and a resistance is also imparted to the flow of the liquid. Also, if the above differential pressure rises to meet or exceed the valve-opening pressure of the leaf valve 21a, the peripheral part of the leaf valve 21a flexes, liquid proceeds from the compression side chamber Lb to the extension side chamber La through a gap formed between the peripheral part and the piston 2, and a resistance is also imparted to the flow of the liquid.

In this way, the hard side damping element 21 configured to include the orifice 21b and the leaf valve 21a in parallel with the orifice 21b is a compression side first damping element that imparts a resistance to the flow of liquid proceeding from the compression side chamber Lb to the extension side chamber La when the shock absorber D contracts. Additionally, the resistance imparted by the compression side hard side damping element 21 is caused by the orifice 21b in the case where the piston speed is in the low-speed range, and by the leaf valve 21a in the case of the medium- to high-speed range.

On the other hand, the extension side check valve 20 opens the extension side passage 2a when the shock absorber D extends and allows a flow of liquid proceeding through the extension side passage 2a from the extension side chamber La to the compression side chamber Lb, but keeps the extension side passage 2a closed when the shock absorber D contracts. Note that the extension side check valve 20 according to the present embodiment is a leaf valve, but may also be a poppet valve or the like. Furthermore, the extension side passage 2a and the extension side check valve 20 may also be omitted insofar as an insufficiency of suctioned liquid does not occur inside the cylinder 1.

Next, to change the flow rate of liquid passing through the hard side damping element 21, the piston rod 3 is provided with the damping force adjustment valve V configured to change the flow channel area provided partway in the bypass passage 3a that bypasses the hard side damping element 21 and communicates with the extension side chamber La and the compression side chamber Lb, and a soft side damping element 50 provided in series with the damping force adjustment valve V partway in the bypass passage 3a.

More specifically, as illustrated in FIG. 2, the piston rod 3 includes a tubular yoke 31 into which the damping force adjustment valve V is inserted, a piston holding member 30 mounted on the inner perimeter of an opening in the lower part of FIG. 2 that acts as the leading end of the yoke 31, and a tubular rod body 32 coupled to the trailing end side of the yoke 31 and extending out from the cylinder 1. The piston holding member 30 includes a closed-bottom cylindrical housing part 30a and a piston mounting shaft 30b protruding downward from the bottom portion of the housing part 30a, and the annular piston 2 is secured together with the hard side damping element 21 to the perimeter of the piston mounting shaft 30b by a nut N.

On the inner perimeter of the tubular portion of the housing part 30a in the piston holding member 30, a valve case 5 that partitions the inner side into an upper chamber 30c and a lower chamber 30d is secured. In the valve case 5, a passage 5a that communicates with the upper chamber 30c and the lower chamber 30d is formed, and the soft side damping element 50 is provided in the passage 5a. Furthermore, the piston mounting shaft 30b of the piston holding member 30 is provided with a longitudinal hole 30e that opens from the leading end at the lower end in FIG. 2 and communicates with the compression side chamber Lb and the damping force adjustment valve V through the upper chamber 30c and the lower chamber 30d. The perimeter of the leading end of the piston mounting shaft 30b is provided with a thread part 30f onto which the nut N is screwed. Furthermore, on the sides of the piston mounting shaft 30b, transverse holes 30g that open from a higher position than the thread part 30f in FIG. 2 and communicate with the longitudinal hole 30e are provided. The leaf valve 21a, the piston 2, the extension side check valve 20, and a tubular collar 19 are mounted on the perimeter of the piston mounting shaft 30b, and the leaf valve 21a, the piston 2, the extension side check valve 20, and the tubular collar 19 are secured to the piston mounting shaft 30b by being caught between the nut N screwed onto the thread part 30f and the housing part 30a.

The inner perimeter of the leaf valve 21a is secured to the piston mounting shaft 30b while the outer perimeter is allowed to flex to open and close the compression side passage 2b, and the extension side check valve 20 opens and closes the extension side passage 2a by sliding in the axial direction on the perimeter of the piston mounting shaft 30b.

Also, the collar 19 has a tubular shape and is provided with a large-diameter tube part 19a having an inner diameter greater than the outer diameter of the piston mounting shaft 30b, a flange part 19b provided on the lower inner perimeter of the tube part 19a as seen in FIG. 2 that is fitted to the perimeter of the piston mounting shaft 30b, and a plurality of holes 19c provided in the tube part 19a and communicating with the interior and the exterior of the tube part 19a. Furthermore, when the collar 19 is mounted to the perimeter of the piston mounting shaft 30b as described above, the tube part 19a faces the transverse holes 30g in the radial direction such that the transverse holes 30g of the piston mounting shaft 30b communicate with the compression side chamber Lb through the holes 19c.

Note that the flow channel area of all of the holes 19c of the collar 19 is set to be equal to or greater than the flow channel area of all of the transverse holes 30g, and as long as this condition is satisfied, the number of provided holes 19c may be set freely. Moreover, any number of transverse holes 30g may be provided insofar as the total flow channel area of the longitudinal hole 30e and the transverse holes 30g is equal to or greater than the flow channel area of the damping force adjustment valve V in the fully open state. Also, the transverse holes 30g may have any shape, and for example may be configured as elongated holes or the like along the circumferential direction of the piston mounting shaft 30b.

Next, the yoke 31 is provided with a flange part 31a that projects outward from the perimeter of the leading end of the rod body 32, a housing tube 31b that hangs down from the flange 31a and into which the damping force adjustment valve V is inserted, a plurality of through-holes 31c that open from the sides of the housing tube 31b and lead to the interior, and a plurality of grooves 31d on the perimeter of the housing tube 31b that extend from the end on the anti-piston side and lead to the through-holes 31c. Consequently, a plurality of grooves 31d are provided on the perimeter of the yoke 31 extending in the axial direction from the end of the anti-piston side to the through-holes 31c.

Also, on the inner perimeter of the housing tube 31b, which is the inner perimeter at the lower end of the yoke 31, a screw part 31e that screws into the inner perimeter at the upper end of the housing part 30a is provided, such that the piston holding member 30 is fastened to the yoke 31 by screwing. Note that the yoke 31 and the piston holding member 30 may also be fastened together by adopting a fastening method other than screwing, such as welding or press fitting. In this way, the extension side chamber La and the inner side of the yoke 31 communicate through the through-holes 31c, and the damping force adjustment valve V is provided partway in the passage joining the through-holes 31c and the upper chamber 30c. Note that the yoke 31 may house the damping force adjustment valve V fully or partially.

In addition, the outer diameter of the yoke 31 housing the damping force adjustment valve V and the soft side damping element 50 and also the piston holding member 30 is smaller than the inner diameter of the cylinder 1, and care is taken so that the extension side chamber La is not partitioned off by above parts.

Note that six through-holes 31c are provided at equal intervals along the circumferential direction of the yoke 31, but it is sufficient for the flow channel area of all of the through-holes 31c and the flow channel area of an annular gap X between the yoke 31 and the cylinder 1 at the spot on the anti-piston side higher than the position where the through-holes 31c are provided as seen in FIG. 2 to be equal to or greater than the flow channel area of the damping force adjustment valve V in the fully open state, and any number of the through-holes 31c and the grooves 31d may be provided. Also, the through-holes 31c may have any shape, and may be configured as elongated holes or the like along the circumferential direction of the yoke 31. Furthermore, in the present embodiment, six grooves 31d are provided in respective correspondence with the through-holes 31c, but a single groove 31d may also communicate with a plurality of the through-holes 31c.

Also, in the present embodiment, the grooves 31d are provided along the axial direction on the perimeter of the yoke 31, and the length of the grooves 31d is shortest on the line connecting the end of the anti-piston side of the yoke 31 to the through-holes 31c. Consequently, care is taken such that the resistance is minimized when the liquid passes through the grooves 31d compared to a case where the grooves 31d are formed obliquely or meander with respect to the axial direction of the yoke 31.

In the present embodiment, the bypass passage 3a is configured to include the through-holes 31c, the upper chamber 30c, the lower chamber 30d, the longitudinal hole 30e, and the transverse holes 30g formed in the yoke 31 or the piston holding member 30 described above, such that the bypass passage 3a bypasses the hard side damping element 21 to communicate with the extension side chamber La and the compression side chamber Lb. Additionally, the damping force adjustment valve V and the soft side damping element 50 are provided in series partway in the bypass passage 3a.

The soft side damping element 50 is configured to include a leaf valve 50a stacked on the upper side of the valve case 5 and an orifice 50b provided in parallel with the leaf valve 50a.

The leaf valve 50a is a thin annular plate formed using a metal or the like, or a laminated body formed by stacking such annular plates, is elastic, and is mounted on the valve case 5 in a state allowing outward circumferential flexion. Furthermore, the pressure of the lower chamber 30d acts on the leaf valve 50a in a direction causing the peripheral part to flex upward. Also, the orifice 50b is formed by a notch provided in the peripheral part of the leaf valve 50a that leaves and lands on a valve seat of the valve case 5, but may also be formed by a stamp or the like provided in the seat.

When the shock absorber D contacts and the damping force adjustment valve V opens the bypass passage 3a, the pressure of the lower chamber 30d rises above the pressure of the upper chamber 30c. Furthermore, in the case where the piston speed is in a low-speed range during such contraction of the shock absorber D, and the differential pressure between the upper chamber 30c and the lower chamber 30d does not satisfy the valve-opening pressure of the leaf valve 50a, liquid passes through the orifice 50b and proceeds from the lower chamber 30d to the upper chamber 30c, that is, from the compression side chamber Lb to the extension side chamber La, and a resistance is also imparted to the flow of the liquid. Also, if the above differential pressure rises to meet or exceed the valve-opening pressure of the leaf valve 50a, the peripheral part of the leaf valve 50a flexes, liquid proceeds from the lower chamber 30d to the upper chamber 30c, that is, from the compression side chamber Lb to the extension side chamber La through a gap formed between the peripheral part and the valve case 5, and a resistance is also imparted to the flow of the liquid.

In this way, the soft side damping element 50 configured to include the orifice 50b and the leaf valve 50a in parallel with the orifice 50b is a compression side second damping element that imparts a resistance to the flow of liquid proceeding through the bypass passage 3a from the compression side chamber Lb to the extension side chamber La when the shock absorber D contracts. Additionally, the resistance imparted by the soft side damping element 50 is caused by the orifice 50b in the case where the piston speed is in the low-speed range, and by the leaf valve 50a in the case of the medium- to high-speed range.

Also, the leaf valve 50a of the soft side damping element 50 is a less rigid (more flexible) valve than the leaf valve 21a of the hard side damping element 21, and in the case where the flow rate is the same, the resistance (pressure loss) imparted to the flow of liquid is smaller. In other words, under identical conditions, liquid passes through the leaf valve 50a more easily than the leaf valve 21a. Furthermore, the orifice 50b of the soft side damping element 50 is an orifice having a greater aperture area than the orifice 21b of the hard side damping element 21, and in the case where the flow rate is the same, the resistance (pressure loss) imparted to the flow of liquid is smaller.

Next, as illustrated in FIG. 2, the damping force adjustment valve V is provided with a tubular spool 7 that acts as a damping force adjustment unit inserted to allow reciprocating motion inside a tubular holder 6 secured inside the piston rod 3, a solenoid 9 that drives the spool 7 in the axial direction, and a biasing spring 8 that biases the spool 7 in opposition to the thrust of the solenoid 9. Additionally, the damping force adjustment valve V adjusts the position of the spool 7 inside the holder 6 to adjust the magnitude of the opening degree.

More specifically, the holder 6 is disposed higher than the valve case 5 inside the piston rod 3 along the central axis of the piston rod 3, with one end pointed upward (the yoke 31 side) and the other end pointed downward (valve case 5 side). Furthermore, a plurality of ports 6a and 6b provided at positions offset in the axial direction and penetrating in the radial direction are formed in the holder 6. The port 6a includes four elongated holes 6a1 and 6a2 provided at equal intervals along the circumferential direction of the holder 6. Note that since FIG. 2 is a cross section, the elongated holes on the front and back sides of the page are not illustrated. The port 6b includes four elongated holes 6b1 and 6b2 provided at equal intervals along the circumferential direction and disposed at positions offset lower than the port 6a in the holder 6 as seen in FIG. 2. Note that since FIG. 2 is a cross section, the elongated holes on the front and back sides of the page are not illustrated. In this way, the holder 6 is provided with the plurality of ports 6a and 6b at positions offset in the axial direction. The ports 6a and 6b communicate with the extension side chamber La through the through-holes 31c of the yoke 31, and are opened and closed by the spool 7. In addition, the holder 6 is provided with a flange part 6d that is fitted to the inner perimeter of the housing part 30a of the piston holding member 30 at the lower end as seen in FIG. 2.

The spool 7 is tubular and slidably inserted into the holder 6 so as to allow reciprocating motion in the vertical direction as seen in FIG. 2. More specifically, the spool 7 is provided with a communicating port 7a configured to face the port 6a in correspondence with the port 6a and a communicating port 7b configured to face the port 6b in correspondence with the port 6b. The communicating ports 7a and 7b are disposed at positions offset with respect to the spool 7 in the axial direction, that is, the movement direction of the spool 7, and more specifically, are provided in the spool 7 with the same arrangement as the arrangement in the axial direction of the ports 6a and 6b with respect to the holder 6. In other words, the intervals in the axial direction of the communicating ports 7a and 7b are equal to the intervals in the axial direction of the ports 6a and 6b, such that if the port 6a communicates with the corresponding communicating port 7a, the port 6b also communicates with the communicating port 7b. Therefore, if any port 6a (6b) communicates with the corresponding communicating port 7a (7b), all of the ports 6a and 6b communicate with the respectively corresponding communicating ports 7a and 7b. Also, the communicating port 7a includes four elongated holes 7a1, 7a2, and 7a3 provided at equal intervals along the circumferential direction of the spool 7. Note that since FIG. 2 is a cross section, the elongated holes on the front side are not illustrated. The communicating port 7b includes four elongated holes 7b1, 7b2, and 7b3 provided at equal intervals along the circumferential direction and disposed at positions offset lower than the communicating port 7a in the spool 7 as seen in FIG. 2. Note that since FIG. 2 is a cross section, the elongated holes on the front side are not illustrated. The phrase "the communicating ports 7a and 7b respectively corresponding to each of the ports 6a and 6b" means that each of the communicating ports 7a and 7b correspond to each of the ports 6a and 6b in a one-to-one relationship, such that the communicating port 7a corresponds to the port 6a and the communicating port 7b corresponds to the port 6b.

Additionally, an annular groove 7c provided along the circumferential direction and communicating with all of the communicating port 7a and an annular groove 7d provided along the circumferential direction and communicating with all of the communicating port 7b are provided on the perimeter of the spool 7. In the present embodiment, the annular groove 7c is upright with respect to the communicating port 7a such that the vertical height of the annular groove 7c matches the vertical height of the communicating port 7a as seen FIG. 2. The annular groove 7d is upright with respect to the communicating port 7b such that the vertical height of the annular groove 7d as seen in FIG. 2 matches the vertical height of the communicating port 7b as seen FIG. 2. Additionally, the interval between the annular groove 7c and the annular groove 7d in the axial direction of the spool 7 is equal to the interval between the ports 6a and 6b in the axial direction.

When the spool 7 configured in this way is inserted into the holder 6, the ports 6a and 6b provided in the holder 6 are opened and closed. Specifically, in the state where the annular groove 7c provided on the perimeter of the spool 7 faces the corresponding port 6a and the annular groove 7d provided on the perimeter of the spool 7 faces the corresponding port 6b, the spool 7 causes the ports 6a and 6b to communicate with the interior of the spool 7 through the communicating ports 7a and 7b. The ports 6a and 6b communicate with the extension side chamber La through the through-holes 31c provided in the yoke 31. On the other hand, the interior of the spool 7 communicates with the compression side chamber Lb through the upper chamber 30c, the passage 5a provided in the valve case 5, the lower chamber 30d, and the longitudinal hole 30e. Consequently, the damping force adjustment valve V is provided partway in the bypass passage 3a, and when the ports 6a and 6b communicate with the interior of the spool 7, the damping force adjustment valve V opens and thereby opens the bypass passage 3a, causing the extension side chamber La and the compression side chamber Lb to communicate through the bypass passage 3a.

Additionally, if the spool 7 moves with respect to the holder 6, the area in which the port 6a faces the annular groove 7c and the area in which the port 6b faces the annular groove 7d change, thereby making it possible to change the flow channel area according to the position of the spool 7 in the axial direction with respect to the holder 6. If the spool 7 moves downward with respect to the holder 6 as seen in FIG. 2 until the ports 6a and 6b no longer face the respective annular grooves 7c and 7d at all and become closed by the perimeter of the spool 7, the communication between the ports 6a and 6b and the corresponding communicating ports 7a and 7b is broken, and the bypass passage 3a is blocked. If the spool 7 moves downward with respect to the holder 6 from the position illustrated in FIG. 2, the annular groove 7c begins to face the port 6a, and at the same time, the annular groove 7d also begins to face the port 6b. Also, from the state in which the annular groove 7c is facing the port 6a and the annular groove 7d is facing the port 6b, if the spool 7 moves upward with respect to the holder 6, the annular groove 7c will no longer face the port 6a, and at the same time, the annular groove 7d will no longer face the port 6b. In this way, if the spool 7 moves in the axial direction with respect to the holder 6, the opening degree of the port 6a and the port 6b changes, and the flow channel area of the damping force adjustment valve V increases or decreases.

Also, a plate 70 is stacked on the upper end of the spool 7, and a plunger 9a described later of the solenoid 9 abuts the plate 70. On the other hand, the biasing spring 8 abuts the lower end of the spool 7, and the spool 7 is biased upward in the movement direction as seen in FIG. 2. The biasing spring 8 is configured to have a helical shape that exhibits a biasing force acting to return the inner perimeter to the original position if the inner perimeter is displaced vertically as seen in FIG. 2 with respect to the outer perimeter. The biasing spring 8 is secured to the piston rod 3 by being caught between the flange part 6d of the holder 6 and a tubular spacer 22 having a perimeter positioned below the biasing spring 8 and fitted to the inner perimeter of the housing part 30a of the piston holding member 30. Additionally, the inner perimeter of the biasing spring 8 is fitted to an annular depression 7e provided on the perimeter of the lower end of the spool 7 as seen in FIG. 2. The biasing spring 8 biases the spool 7 with respect to the holder 6 upward in the movement direction as seen in FIG. 2, and if the spool 7 is displaced downward as seen in FIG. 2 with respect to the holder 6, the biasing spring 8 exhibits a biasing force acting to return the spool 7 to the original position. In the state where the spool 7 is biased by the biasing force of the biasing spring 8 while not receiving thrust opposing the biasing force of the biasing spring 8 from the solenoid 9, the spool 7 is positioned farthest upward and the annular grooves 7c and 7d do not face the ports 6a and 6b, as illustrated in FIG. 2. Consequently, the damping force adjustment valve V blocks the bypass passage 3a when not energized.

Further, the solenoid 9 of the damping force adjustment valve V is contained in the yoke 31, and although a detailed illustration is omitted, includes a tubular stator that includes a coil, a tubular movable iron core movably inserted into the stator, and the plunger 9a mounted on the inner perimeter of the movable iron core and having a leading end that abuts the plate 70. A harness 90 that supplies electric power to the solenoid 9 projects out through the inner side of the rod body 32, and is connected to a power source.

Additionally, when the solenoid 9 is energized through the harness 90, the movable iron core is drawn to the lower side, the plunger 9a moves downward, and the spool 7 is pushed down in opposition to the biasing force of the biasing spring 8. Subsequently, the port 6a and the communicating port 7a communicate through the annular groove 7c, the port 6b and the communicating port 7b communicate through the annular groove 7d, and the damping force adjustment valve V opens. The relationship between the opening degree of the damping force adjustment valve V and the energization level of the solenoid 9 is a proportional relationship having a positive constant of proportionality, such that the opening degree increases as the energization level rises. Furthermore, if electrical continuity to the solenoid 9 is cut, the damping force adjustment valve V closes.

In this way, the damping force adjustment valve V according to the present embodiment is a normally-closed type in which the spool 7 that acts as the valving element is biased in the closing direction by the biasing spring 8, and thrust in the opening direction is imparted to the spool 7 by the solenoid 9. Also, the opening degree of the damping force adjustment valve V increases proportionally with the energization level, and the flow channel area of the bypass passage 3a increases as the opening degree increases. Consequently, the flow channel area of the bypass passage 3a may be considered to increase proportionally with the energization level of the damping force adjustment valve V.

Next, the shock absorber D according to the present embodiment is provided with a manual valve 41 for manually adjusting the flow rate of the hard side damping element 21. As illustrated in FIG. 1, the manual valve 41 is provided in a bottom portion of the shock absorber D, and is configured to change, by manual operation, the flow channel area of a discharge passage 4b that communicates with the compression side chamber Lb and the liquid storage chamber R.

The manual valve 41 includes a needle-shaped valving element 41a that leaves and lands on an annular valve seat (not illustrated) provided partway in the discharge passage 4b. Additionally, when the manual valve 41 is rotated, the valving element 41a moves closer to or farther away from the valve seat depending on the direction of rotation, thereby adjusting the magnitude of the flow channel area of the discharge passage 4b. In the present embodiment, during a normal state in which the damping force adjustment valve V is energized normally, the valving element 41a is seated on the valve seat, such that communication with the discharge passage 4b is blocked by the manual valve 41.

To summarize the above, as illustrated in FIG. 1, the shock absorber D is provided with the cylinder 1, the piston 2 slidably inserted into the cylinder 1 and dividing the interior of the cylinder 1 into the extension side chamber La and the compression side chamber Lb, the piston rod 3 having a leading end joined to the piston 2 and a trailing end projecting out of the cylinder 1, and the tank 16 connected to the extension side chamber La in the cylinder 1, and the pressure of the extension side chamber La is the tank pressure.

Furthermore, the shock absorber D is provided with the extension side passage 2a, the compression side passage 2b, and the bypass passage 3a as a passage that communicates with the extension side chamber La and the compression side chamber Lb. The extension side passage 2a is provided with the extension side check valve 20 that allows only a one-way flow of liquid proceeding from the extension side chamber La to the compression side chamber Lb, such that liquid proceeding from the compression side chamber Lb to the extension side chamber La passes through the compression side passage 2b or the bypass passage 3a.

Additionally, the compression side passage 2b is configured to include the orifice 21b and the leaf valve 21a provided in parallel with the orifice 21b, and is provided with the hard side damping element 21 that imparts a resistance to the flow of liquid. On the other hand, the bypass passage 3a is configured to include the orifice 50b having a larger aperture area than the orifice 21b and the leaf valve 50a that is less rigid than the leaf valve 21a and provided in parallel with the orifice 50b, and is provided with the soft side damping element 50 that imparts a lowered resistance to the flow of liquid.

Furthermore, the damping force adjustment valve V is provided in series with the soft side damping element 50 in the bypass passage 3a, and the flow channel area of the bypass passage 3a can be changed by adjusting the energization level of the damping force adjustment valve V. Additionally, the damping force adjustment valve V is a normally-closed type set to increase the flow channel area of the bypass passage 3a proportionally with the energization level.

Also, in the shock absorber D, the suction passage 4a and the discharge passage 4b are provided as passages that communicate with the compression side chamber Lb and the tank 16. In the suction passage 4a, the suction valve 40 that allows only a one-way flow of liquid proceeding from the tank 16 to the compression side chamber Lb is provided. On the other hand, in the discharge passage 4b, the manual valve 41 of normally-closed type that is opened and closed by manual operation is provided.

The shock absorber D is configured as above, and when the shock absorber D contracts, the piston rod 3 enters the cylinder 1 and the piston 2 compresses the compression side chamber Lb. Normally, the manual valve 41 closes the discharge passage 4b. Consequently, when the shock absorber D contracts, liquid in the compression side chamber Lb moves to the extension side chamber La through compression side passage 2b or the bypass passage 3a. A resistance is imparted to the flow of liquid by the hard side damping element 21 or the soft side damping element 50, and a compression side damping force due to the resistance is produced.

Also, when the shock absorber D contracts normally, the distribution ratio of the liquid passing through the hard side damping element 21 and the soft side damping element 50 changes according to the flow channel area of the bypass passage 3a, and consequently, the magnitude of the produced compression side damping force is adjusted according to the magnitude of the damping coefficient.

Specifically, as described above, the hard side damping element 21 and the soft side damping element 50 are configured to include the orifices 21b and 50b as well as the leaf valves 21a and 50a provided in parallel with the orifices 21b and 50b, respectively. Consequently, in the case where the piston speed is in the low-speed range, the damping force characteristics take on orifice characteristics proportional to the square of the piston speed and specific to orifices, whereas in the case where the piston speed is in the medium- to high-speed range, the damping force characteristics take on valve characteristics proportional to the piston speed and specific to leaf valves.

Additionally, if the energization level of the damping force adjustment valve V rises to increase the opening degree, the flow rate of the bypass passage 3a increases and the proportion of liquid passing through the hard side damping element 21 decreases, while in addition, the proportion of liquid passing through the soft side damping element 50 increases. Because the orifice 50b of the soft side damping element 50 is a large-diameter orifice having a larger aperture area than the orifice 21b of the hard side damping element 21, in the soft mode in which the proportion of liquid proceeding toward the soft side damping element 50 side increases, the damping coefficient becomes smaller in both the low-speed range and the medium- to high-speed range, and the produced compression side damping force decreases with respect to the piston speed. Furthermore, when the amount of current supplied to the damping force adjustment valve V is maximized, the damping coefficient is minimized, and the produced compression side damping force reaches a minimum with respect to the piston speed.

Conversely, if the energization level of the damping force adjustment valve V falls to decrease the opening degree, the flow rate of the bypass passage 3a decreases and the proportion of liquid passing through the hard side damping element 21 increases, while in addition, the proportion of liquid passing through the soft side damping element 50 decreases. Subsequently, the damping coefficient increases and the compression side damping force increases with respect to the piston speed. In addition, if electrical continuity to the damping force adjustment valve V is cut to close the damping force adjustment valve V, communication with the bypass passage 3a is blocked, and therefore the entire flow passes through the hard side damping element 21. Subsequently, the damping coefficient reaches a maximum, and the produced compression side damping force reaches a maximum with respect to the piston speed.

Figure 3:
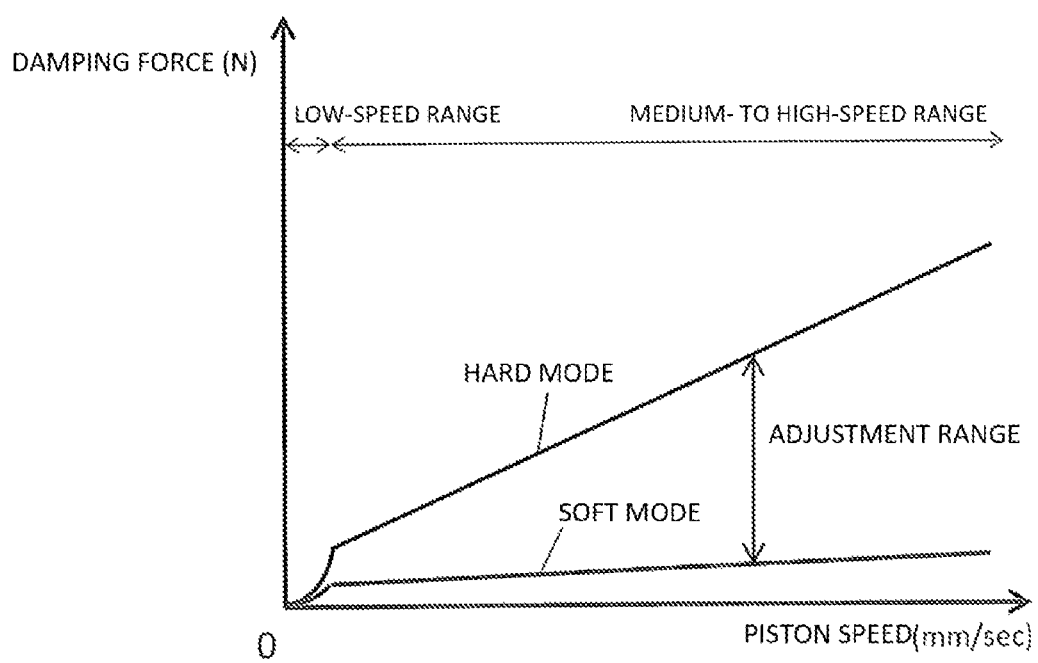
FIG. 3 is a damping force characteristic diagram illustrating the characteristics of the compression side damping force with respect to the piston speed of a shock absorber according to an embodiment of the present invention.

In this way, by using the damping force adjustment valve V to change the distribution ratio of liquid passing through the first and second damping elements, namely the hard side damping element 21 and the soft side damping element 50, the damping coefficient increases or decreases, and as illustrated in FIG. 3, the slope of the characteristic line indicating the compression side damping force characteristics changes. Furthermore, the compression side damping force is adjusted between the hard mode that maximizes the slope of the characteristic line to increase the produced damping force, and the soft mode that minimizes the slope to decrease the produced damping force.

Furthermore, in the soft mode, the slope of the characteristic line indicating the damping force characteristics decreases in both the low-speed range and the medium- to high-speed range, while in the hard mode, the slope of the characteristic line indicating the damping force characteristics increases in both the low-speed range and the medium to high-speed range. Consequently, the change when the damping force characteristics transition from the orifice characteristics to the valve characteristics is gradual in both modes.

Furthermore, the soft side damping element 50 includes the less rigid leaf valve 50a in parallel with the orifice 50b. Consequently, even if a highly rigid valve having a high valve-opening pressure is adopted as the leaf valve 21a of the hard side damping element 21, and the adjustment range is widened in the direction of increasing compression side damping force, the damping force in soft mode does not become excessive.

Furthermore, during failure (non-normal), electrical continuity to the damping force adjustment valve V is cut to switch to the hard mode. At this time, if the manual valve 41 is opened, liquid in the compression side chamber Lb passes through not only the compression side passage 2b, but also the discharge passage 4b, and therefore the flow rate of liquid passing through the hard side damping element 21 decreases and the produced compression side damping force decreases.

Also, liquid equal to the volume of the piston rod 3 entering the cylinder 1 when the shock absorber D contracts is discharged from the extension side chamber La to the tank 16.

Conversely, when the shock absorber D extends, the extension side check valve 20 opens, and liquid in the extension side chamber La moves to the compression side chamber Lb through the extension side passage 2a. At this time, the liquid can pass through the extension side check valve 20 with relatively little resistance. Furthermore, the extension side chamber La communicates with the tank 16 and is maintained at the tank pressure. Consequently, the shock absorber D does not exhibit an extension side damping force. Note that as described above, the shock absorber D is paired with a shock absorber that produces damping force only during extension to form a front fork, and therefore in the case where the front wheel and the vehicle move away from each other, the shock absorber that exhibits a damping force only during extension to moderate vibrations of the vehicle.

Hereinafter, the operation and effect of the shock absorber D according to an embodiment of the present invention will be described. A shock absorber D that addresses the above problem includes a cylinder 1, a piston 2 inserted into the cylinder 1 in a state allowing movement in an axial direction and demarcating an interior of the cylinder 1 into an extension side chamber La and a compression side chamber Lb, a piston rod 3 joined to the piston 2 and having an end that projects out from the cylinder 1, a bypass passage (damping passage) 3a, provided in the piston rod 3, that communicates with the extension side chamber La and the compression side chamber Lb, and a damping force adjustment valve V provided in the bypass passage (damping passage) 3a, in which the damping force adjustment valve V includes a spool (damping force adjustment unit) 7 provided in the bypass passage (damping passage) 3a and a solenoid 9 that drives the spool (damping force adjustment unit) 7 to adjust a flow channel resistance, the piston rod 3 includes a tubular yoke 31 into which the damping force adjustment valve V is inserted, and a piston holding member 30 mounted on an inner perimeter of the yoke 31 and configured to hold the piston 2, and the yoke 31 includes a plurality of through-holes 31c opening from a side of the yoke 31 and leading to an interior of the yoke 31 to form a portion of the bypass passage (damping passage) 3a, and a groove 31d provided on a perimeter of the yoke 31, extending from an anti-piston end, and leading to the through-hole 31c.

In the shock absorber D configured in this way, the through-holes 31c and the grooves 31d are formed on the perimeter of the yoke 31 where the annular gap with respect to the cylinder 1 in which the damping force adjustment valve V is inserted is narrowest, and the flow channel area in the annular gap X between the cylinder 1 and the yoke 31 is enlarged. In the shock absorber D, the flow channel resistance in the annular gap X can be reduced even if the damping force adjustment valve V provided with the solenoid 9 is housed inside the piston rod 3, the problem of the minimum damping force being determined by the flow channel resistance in the annular gap X can be resolved, and the minimum damping force can be adjusted by the damping force adjustment valve V. Consequently, the shock absorber D according to the present invention is capable of widening the damping force adjustment range and also lowering the damping force in the full soft mode, even if a damping force adjustment valve using a solenoid is provided.

Further, in the present embodiment, the groove 31d is provided on the perimeter of the yoke 31 along the axial direction. According to the shock absorber D configured in this way, the length of the groove 31d is shortest on the line connecting the end of the anti-piston side of the yoke 31 to the through-hole 31c, and the resistance when liquid passes through the groove 31d is minimized, thereby reducing the damping force further in the full soft mode and improving the ride quality of the vehicle.

The damping force adjustment valve V in the shock absorber D according to the present embodiment is provided with the tubular holder 6 including the plurality of ports 6a and 6b that communicate with the interior and exterior of the holder 6, the tubular spool 7 inserted into the holder 6 to allow reciprocating motion in the axial direction and also configured to open and close the communicating ports 7a and 7b configured to face the ports 6a and 6b, respectively, and the solenoid 9 that drives the spool 7 in the axial direction. The ports 6a and 6b are provided with respect to the holder 6 at positions offset in the axial direction, and the communicating ports 7a and 7b are provided with respect to the spool 7 at positions offset in the axial direction in the same arrangement as the arrangement of the ports 6a and 6b in the axial direction.

According to the shock absorber D configured in this way, the plurality of ports 6a and 6b and the plurality of communicating ports 7a and 7b having the same arrangement are respectively provided in the holder 6 and the spool 7 offset in the axial direction that is the movement direction of the spool 7, such that the ports 6a and 6b and the communicating ports 7a and 7b may face each other respectively at the same time. Consequently, according to the shock absorber D of the present embodiment, a large flow channel area can be secured when the valve is fully open, even if the stroke length of the spool 7 is shortened with respect to the holder 6. Note that in the present embodiment, the two ports 6a and 6b and the two communicating ports 7a and 7b are provided at positions offset in the axial direction, but three or more ports and communicating ports may also be provided.

Also, in the present embodiment, the ports 6a and 6b are formed by elongated holes 6a1, 6a2, 6a3, 6b1, 6b2, and 6b3 respectively provided along the circumferential direction of the holder 6, and a large flow channel area of the ports 6a and 6b itself can be secured.

Note that the ports 6a and 6b may also be formed by a single elongated hole insofar as the integrity of the holder 6 is not compromised, but forming a plurality of elongated holes has the advantage of increasing the flow channel area while also securing the rigidity of the holder 6. The same applies to the communicating ports 7a and 7b, which may also be formed by a single elongated hole insofar as the integrity of the spool 7 is not compromised, but forming a plurality of elongated holes has the advantage of increasing the flow channel area while also securing the rigidity of the spool 7.

Additionally, in the shock absorber D configured in this way, a large flow channel area can be secured when the damping force adjustment valve V is fully open even if the stroke length is shortened, and therefore even if the damping force adjustment valve is kept compact and built into the shock absorber D, the stroke length of the shock absorber D is not sacrificed, and the resistance on the liquid passing through the bypass passage 3a can be kept to a minimum. Consequently, according to the shock absorber D according to the present invention, a wide damping force adjustment range can be achieved while also securing the stroke length.

Also, the bypass passage (damping passage) 3a in the shock absorber D according to the present embodiment is formed to include the longitudinal hole 30e that opens from the leading end of the piston rod 3 and communicates with the compression side chamber Lb and the damping force adjustment valve V, and the transverse holes 30g that open from the sides of the piston rod 3 and communicate with the compression side chamber Lb and the longitudinal hole 30e.

In the shock absorber D configured in this way, the bypass passage (damping passage) 3a leading to the piston rod 3 and the damping force adjustment valve V is provided, and because the transverse holes 30g are provided in addition to the longitudinal hole 30e where the flow channel area is narrowest, the flow channel area in the bypass passage (damping passage) 3a is enlarged. In the shock absorber D, the flow channel resistance in the bypass passage (damping passage) 3a can be reduced even if the damping force adjustment valve V provided with the solenoid 9 is housed inside the piston rod 3, the problem of the minimum damping force being determined by the flow channel resistance in the longitudinal hole 30e that is mounted in the piston rod 3 can be resolved, and the minimum damping force can be adjusted by the damping force adjustment valve V. Consequently, the shock absorber D according to the present invention is capable of widening the damping force adjustment range and also lowering the damping force in the full soft mode, even if a damping force adjustment valve using a solenoid is provided.

Also, in the shock absorber D according to the present embodiment, the piston rod 3 includes the piston mounting shaft 30b on the perimeter of which the piston 2 is mounted and also onto which the nut N securing the piston 2 is screwed, and is provided with the tubular collar 19 including the holes 19c that communicate with the interior and exterior of the collar 19. The collar 19 is disposed on the perimeter of the piston mounting shaft 30b and is also interposed between the piston 2 and the nut N, such that the transverse holes 30g open at positions facing the collar 19 of the piston mounting shaft 30b. In the shock absorber D configured in this way, even if the piston 2 and the nut N are mounted onto the piston mounting shaft 30b, the transverse holes 30g provided in the piston mounting shaft 30b may be made to communicate with the compression side chamber Lb through the holes 19c provided in the collar 19. Consequently, according to the shock absorber D according to the present embodiment, the transverse holes 30g may be made to communicate with the compression side chamber Lb by simply providing the collar 19 having a simple shape, thereby removing the need to process the piston 2 and the nut N to provide holes with a complex shape for causing the transverse holes 30g to communicate with the compression side chamber Lb, and lowering manufacturing costs.

Furthermore, in the present embodiment, the shock absorber D is provided with the hard side damping element 21 that imparts a resistance to the flow of liquid proceeding from the compression side chamber Lb to the extension side chamber La, the damping force adjustment valve V configured to change the flow channel area of the bypass passage 3a that bypasses the hard side damping element 21 and communicates with the compression side chamber Lb and the extension side chamber La, and the soft side damping element 50 provided in series with the damping force adjustment valve V in the bypass passage 3a. In addition, the hard side damping element 21 is configured to include the orifice 21b and the leaf valve 21a provided in parallel with the orifice 21b. On the other hand, the soft side damping element 50 includes an orifice 50b having a greater aperture area than the orifice 21b (a large-diameter orifice).

According to the above configuration, the characteristics of the damping force produced when the shock absorber D contracts take on orifice characteristics specific to orifices in the case where the piston speed is in a low-speed range, and take on valve characteristics specific to leaf valves in the case where the piston speed is in a medium- to high-speed range. Additionally, if the aperture area of the bypass passage 3a is changed by the solenoid valve V, the distribution ratio of the flow of the liquid moving from the compression side chamber Lb to the extension side chamber La when the shock absorber D contracts that passes through each of the hard side damping element 21 and the soft side damping element 50 changes, and therefore both the damping coefficient in the case where the piston speed is in a low-speed range and the damping coefficient in the case of the medium- to high-speed range can be set freely, and the adjustment range of the compression side damping force in the case where the piston speed is in the medium- to high-speed range can be widened.

Furthermore, in the soft mode that increases the aperture area of the bypass passage 3a, both the damping coefficient in the case where the piston speed is in the low-speed range and the damping coefficient in the case of the medium- to high-speed range decrease. On the other hand, in the hard mode that decreases the aperture area of the bypass passage 3a, the damping coefficient in the case where the piston speed is in the low-speed range and the damping coefficient in the case of the medium- to high-speed range increase. Consequently, when the characteristics of the compression side damping force change from the orifice characteristics in the low-speed range to the valve characteristics in the medium- to high-speed range, the change in the slope of the characteristic line is gradual in both modes. With this configuration, in the case where the shock absorber D according to the present embodiment is installed in a vehicle, discomfort caused by changes in the above slope can be alleviated, and a favorable riding quality of the vehicle can be achieved.

Also, in the shock absorber D according to the present embodiment, the soft side damping element 50 is configured to include the above orifice (large-diameter orifice) 50b as well as the leaf valve 50a provided in parallel with the orifice 50b. In this way, by also providing leaf valve 50a in the soft side damping element 50, the damping force in soft mode does not become excessive, even if the leaf valve 21a of the hard side damping element 21 is a highly rigid valve having a high valve-opening pressure. In other words, according to the above configuration, a highly rigid valve can be adopted as the leaf valve 21a of the hard side damping element 21. Furthermore, with such a configuration, the adjustment range of the damping force is widened in the direction of increasing compression side damping force, and therefore the adjustment range of the compression side damping force in the case where the piston speed is in the medium- to high-speed range can be widened further.

Also, in the shock absorber D according to the present embodiment, the piston 2 is a single rod type joined to the other end of the piston rod 3. Furthermore, the shock absorber D is provided with the tank 16 connected to the extension side chamber La and the suction valve 40 that allows only a flow of liquid proceeding from the tank 16 to the compression side chamber Lb. According to the above configuration, the volume equal to the piston rod 3 entering and exiting the cylinder 1 can be compensated for by the tank 16. Moreover, the shock absorber D can be configured as a one-sided shock absorber that exhibits damping force only in the compression stroke.

Also, in the shock absorber D according to the present embodiment, the damping force adjustment valve V is set such that the opening degree varies proportionally with the energization level. According to this configuration, the aperture area of the bypass passage 3a can be changed continuously.

Also, the shock absorber D according to the present embodiment is provided with the manual valve 41 configured to change, by manual operation, the flow channel area of the discharge passage 4b that communicates with the compression side chamber Lb and the tank 16. According to the above configuration, even if the damping force adjustment valve V is closed during failure, the produced compression side damping force can be reduced by manually opening the manual valve 41. Consequently, an excessive compression side damping force during a failure mode can be prevented, and a favorable ride quality of the vehicle can be achieved.

Figure 4:
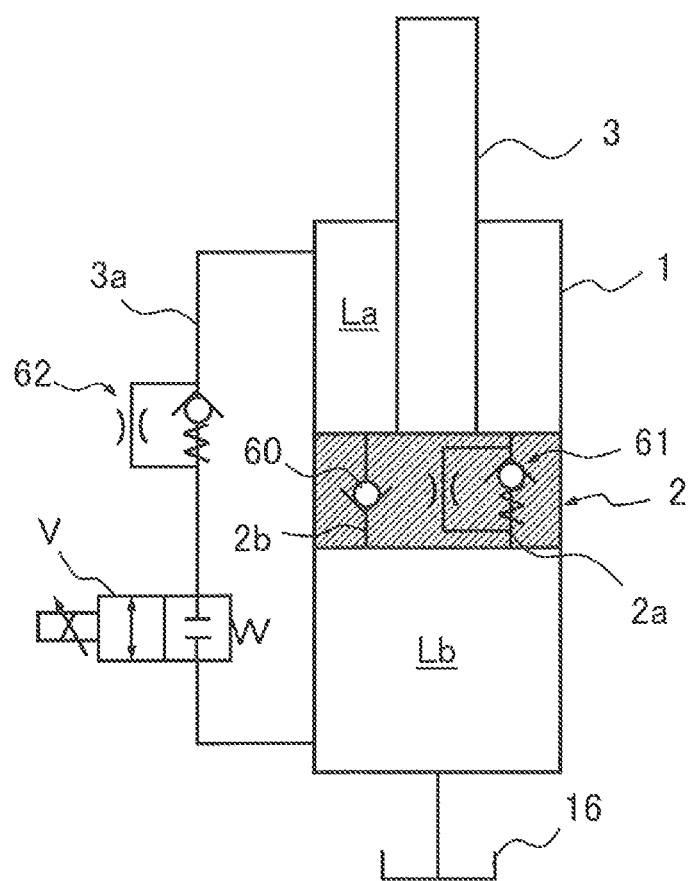
FIG. 4 is a hydraulic circuit diagram of a shock absorber according to a modification of an embodiment of the present invention.

Note that in the present embodiment, the shock absorber D is configured as a one-sided shock absorber that exhibits a damping force only during contraction, but like the shock absorber illustrated by the hydraulic circuit diagram in FIG. 4, a check valve 60 that allows only a flow of liquid proceeding from the compression side chamber Lb to the extension side chamber La may be provided instead of the hard side damping element 21 in the compression side passage 2b, a hard side damping element 61 that imparts a resistance to the flow of liquid proceeding from the extension side chamber La to the compression side chamber Lb through the extension side passage 2a as a damping passage may be provided, a soft side damping element 62 that imparts a resistance to the flow of liquid proceeding from the extension side chamber La to the compression side chamber Lb may be provided instead of the soft side damping element 50 in the bypass passage 3a, the suction valve 40 in the suction passage 4a may be removed, and the discharge passage 4b and the manual valve 41 may be removed to configure the shock absorber D as a shock absorber that exhibits a damping force only during extension. If the shock absorber D is configured in this way, the damping coefficient is increased or decreased by changing the soft side damping element configured to include a leaf valve and the distribution ratio of liquid passing through the soft side damping element with the damping force adjustment valve V, and therefore the slope of the characteristic line indicating the extension side damping force characteristics can be changed similarly to the shock absorber D that exhibits a damping force only during compression.

Also, in each embodiment, if it is not necessary to set the damping force characteristics to valve characteristics in the case where the piston speed is in a normal speed range, only the damping force adjustment valve V may be provided in the bypass passage 3a and the soft side damping element 50 may be omitted, or the hard side damping element 21 may also be removed and the damping force on the compression side, the extension side, or both sides may be adjusted with the damping force adjustment valve V alone.

Although the preferred embodiments of the present invention have been described above in detail, modifications, variations, and changes are possible without departing from the scope of the claims.

REFERENCE SIGNS LIST

1 Cylinder
2 Piston
3 Piston rod
3a Bypass passage (damping passage)
7 Spool (damping force adjustment unit)
9 Solenoid
30 Piston holding member
31 Yoke
31c Through-hole
31d Groove
D Shock absorber
La Extension side chamber
Lb Compression side chamber
V Damping force adjustment valve

The invention claimed is:

1. A shock absorber comprising:
a cylinder;
a piston inserted into the cylinder in a state allowing movement in an axial direction and demarcating an interior of the cylinder into an extension side chamber and a compression side chamber;
a piston rod joined to the piston and having an end that projects out from the cylinder;
a damping passage, provided in the piston rod, that communicates with the extension side chamber and the compression side chamber; and
a damping force adjustment valve provided in the damping passage, wherein
the damping force adjustment valve includes a damping force adjustment unit provided in the damping passage and a solenoid that drives the damping force adjustment unit to adjust a flow channel resistance,
the piston rod includes a tubular yoke into which the damping force adjustment valve is inserted, and a piston holding member mounted on an inner perimeter of the yoke and configured to hold the piston, and
the yoke includes a through-hole opening from a side of the yoke and leading to an interior of the yoke to form a portion of the damping passage, and a groove provided on a perimeter of the yoke, extending from an anti-piston end, and leading to the through-hole.

2. The shock absorber according to claim 1, wherein the groove is provided along an axial direction of the yoke.

* * * * *